United States Patent [19]
Kato et al.

[11] Patent Number: 5,553,066
[45] Date of Patent: Sep. 3, 1996

[54] DATA TRANSFER SYSTEM INCLUDING EXCHANGE

[75] Inventors: Yoshiharu Kato; Ryouzi Takano; Takashi Nara; Takashi Hatano, all of Kawasaki; Yoshio Morita, Yokohama, all of Japan

[73] Assignee: Fujitsu Limited, Kawasaki, Japan

[21] Appl. No.: 307,109

[22] Filed: Sep. 16, 1994

Related U.S. Application Data

[63] Continuation of Ser. No. 951,776, Sep. 28, 1992, abandoned.

[30] Foreign Application Priority Data

Sep. 27, 1991 [JP] Japan .................................. 3-249121

[51] Int. Cl.⁶ .................................................. H04J 3/16
[52] U.S. Cl. ..................... 370/58.1; 370/83; 370/95.1
[58] Field of Search ........................... 370/95.1, 95.2, 370/95.3, 94.1, 94.2, 94.3, 79, 80, 58.1–58.3, 85.7, 82, 83, 85.8, 112, 118

[56] References Cited

U.S. PATENT DOCUMENTS

| | | | |
|---|---|---|---|
| 3,632,882 | 1/1972 | Ciercierski | 179/15 BA |
| 4,531,212 | 7/1985 | Haelziomerovi | 370/112 |
| 4,852,089 | 7/1989 | Berry et al. | 370/95.1 |
| 4,987,570 | 1/1991 | Almond et al. | 370/84 |
| 5,005,170 | 4/1991 | Nelson | 370/84 |
| 5,029,163 | 7/1991 | Chao et al. | 370/95.1 |
| 5,050,166 | 9/1991 | Cantoni et al. | 370/95.1 |

FOREIGN PATENT DOCUMENTS

| | | |
|---|---|---|
| 2262933 | 6/1974 | Germany . |
| 3001417 | 5/1981 | Germany . |
| 1-286695 | 11/1989 | Japan . |
| 1-286697 | 11/1989 | Japan . |

OTHER PUBLICATIONS

Patent Abstracts of Japan, vol. 003, No. 135 (E–150) 10 Nov. 1979 & JP-A-54 114 030 (NTT) *abstract*.

ICL Technical Journal, vol. 3, No. 3, May 1983, Hitchin GB, "Evolution of Switched Telecommunication Networks", C. J. Hughes, pp. 313–329.

*Primary Examiner*—Benedict V. Safourek
*Assistant Examiner*—Ajit Patel
*Attorney, Agent, or Firm*—Staas & Halsey

[57] ABSTRACT

A data transfer system including an exchange, wherein the exchange transfers data by sharing a plurality of channels by a time division multiplex mode. In this case, the exchange transfers the data by variably allocating respective time slots to be occupied by the respective channels. That is, it is possible to allot any line speed to any channel and therefore possible to mix signals with different data transfer speeds in the frames. This results in an exchange network with a high degree of freedom of transfer for the subscriber terminal equipment.

9 Claims, 16 Drawing Sheets

DATA TRANSFER SYSTEM INCLUDING EXCHANGE this application is a continuation of application Ser. No. 07/951,776, filed Sep. 28, 1992, now abandoned.

BACKGROUND OF THE INVENTION

1. Field of the Invention

The present invention relates to a data transfer system including an exchange, wherein data is transferred to and from a plurality of units of subscriber terminal equipment under its jurisdiction by sharing in a time division multiplex mode a plurality of channels set up by allocating a series of time slots, more particularly relates to control of the transfer of data in the exchange.

2. Description of the Related Art

As will be explained later in more detail, in a typical control of transfer by the time division multiplex mode, data is transferred with a one-to-one correspondence of channels with time slots. That is, data going to and from 128 units of subscriber terminal equipment and the exchange is transferred by sharing periodically 128 channels allocated corresponding to the subscriber terminal equipment in synchronization with 128 time slots.

Control of the transfer of data by the typical time division multiplex mode described above enables data to be transferred between the units of subscriber terminal equipment and an exchange without problem or any inconvenience.

In recent years, however, subscriber terminal equipment has diversified and subscribers have been demanding more sophisticated services. To deal with this, control of the transfer of data based on new techniques going far beyond the bounds of current thinking has become necessary.

SUMMARY OF THE INVENTION

Therefore, the present invention has as its object the provision of a data transfer system including an exchange which is based on a completely new technique of control. More specifically, it has as its object the realization of an exchange network with a high degree of freedom of data transfer for the subscriber terminal equipment.

To attain the above objects, the present invention transfers data by variably allocating to the channels channel lengths to be occupied by the same.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the problems therein will be first described with reference to the related figures.

Figure 1:
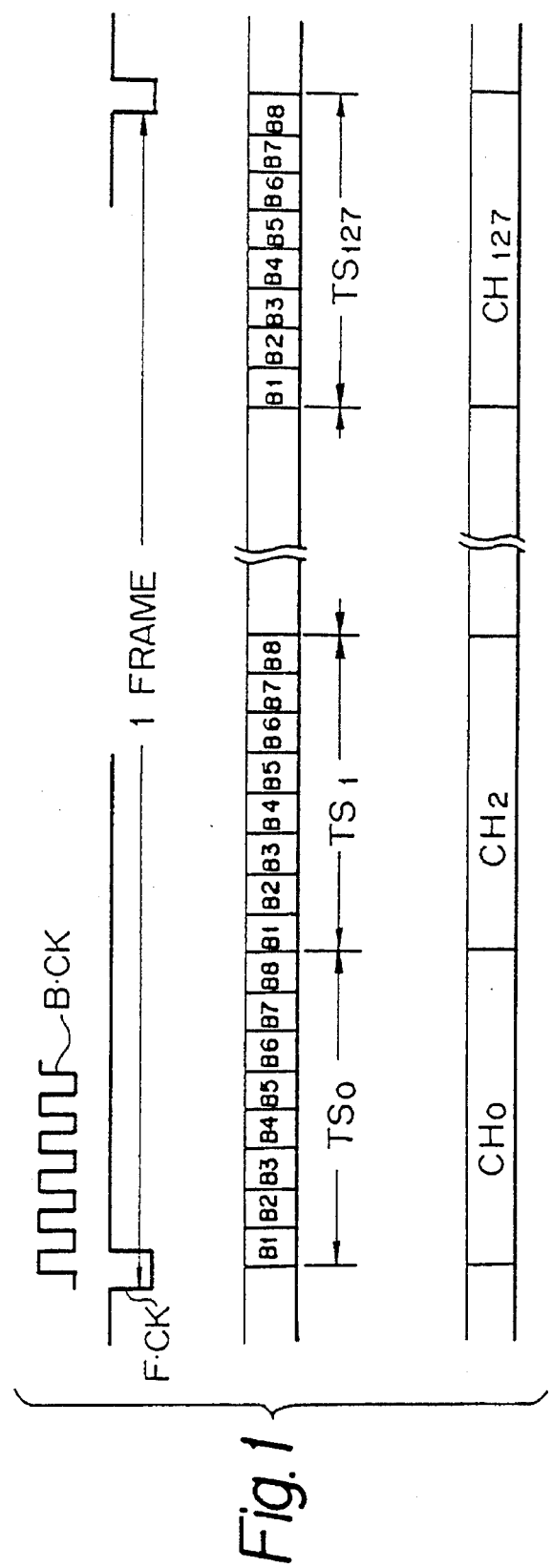
FIG. 1 is a view of typical control of the transfer of data by the time division multiplex mode.

FIG. 1 is a view of typical control of the transfer of data by the time division multiplex mode. In the figure, $CH_0$, $CH_1$ . . . $CH_{127}$ in the lowest row are channels (CH) which transfer data share. For example, there are 128 channels in a frame. The channel lengths of these 128 channels are defined by the time slots (TS). The time slots are so-called "time scales". Each time slot is, for example, comprised of 8 bits such as B1, B2 . . . B8. Each bit is completely synchronized with the basic clock B.CK shown in the highest row. The series of these time slots ($TS_0$, $TS_1$ . . . $TS_{127}$) repeatedly appears as a unit synchronized with the frame clocks F.CK.

In this way, in the typical control of data transfer by the time division multiplex mode, data is transferred with a one-to-one correspondence of channels (CH) with time slots (TS). That is, data going to and from 128 units of subscriber terminal equipment and the exchange is transferred by sharing periodically 128 channels allocated corresponding to the units of the subscriber terminal equipment in synchronization with 128 time slots. As mentioned earlier, however, in recent years, subscriber terminal equipment has diversified and subscribers have been demanding more sophisticated services. To deal with this, control of the transfer of data based on new techniques going far beyond the bounds of current thinking has become necessary.

Figure 2:
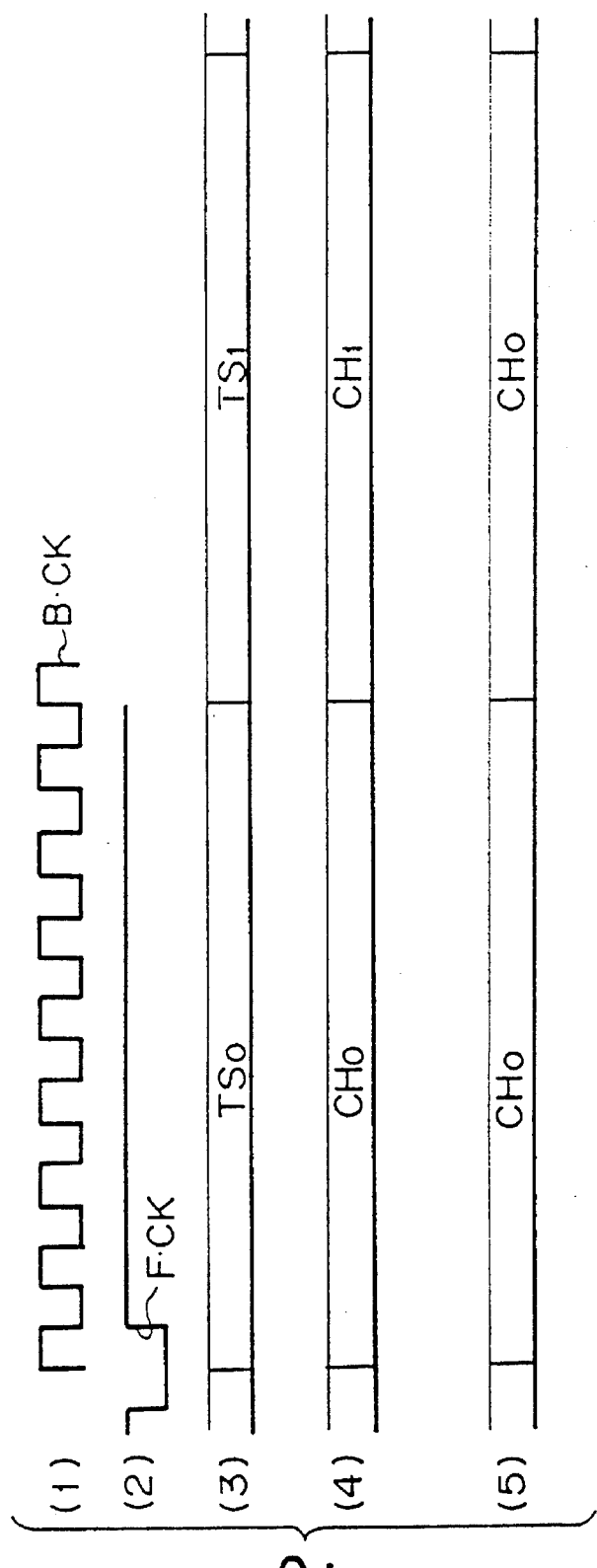
FIG. 2 is a view of the basic mode of control of data transfer according to the present invention.

FIG. 2 is a view of the basic mode of control of data transfer according to the present invention. In the figure, B.CK, F.CK, $TS_0$, $TS_1$, $CH_0$, and $CH_1$ have the meanings mentioned above. The characteristic feature of the present invention is shown in row (5). According to row (5), it is learned that data is transferred by a single channel $CH_0$ spanning the time slots $TS_0$ and $TS_1$. That is, data is transferred by a channel length twice that of the past.

In short, the channel lengths to be occupied by channels are variably allocated to the channels (CH). Therefore, as shown in row (4) of the figure, one is free to make the conventional typical allocations of $TS_0$–$CH_0$ and $TS_1$–$CH_1$.

Figure 3:
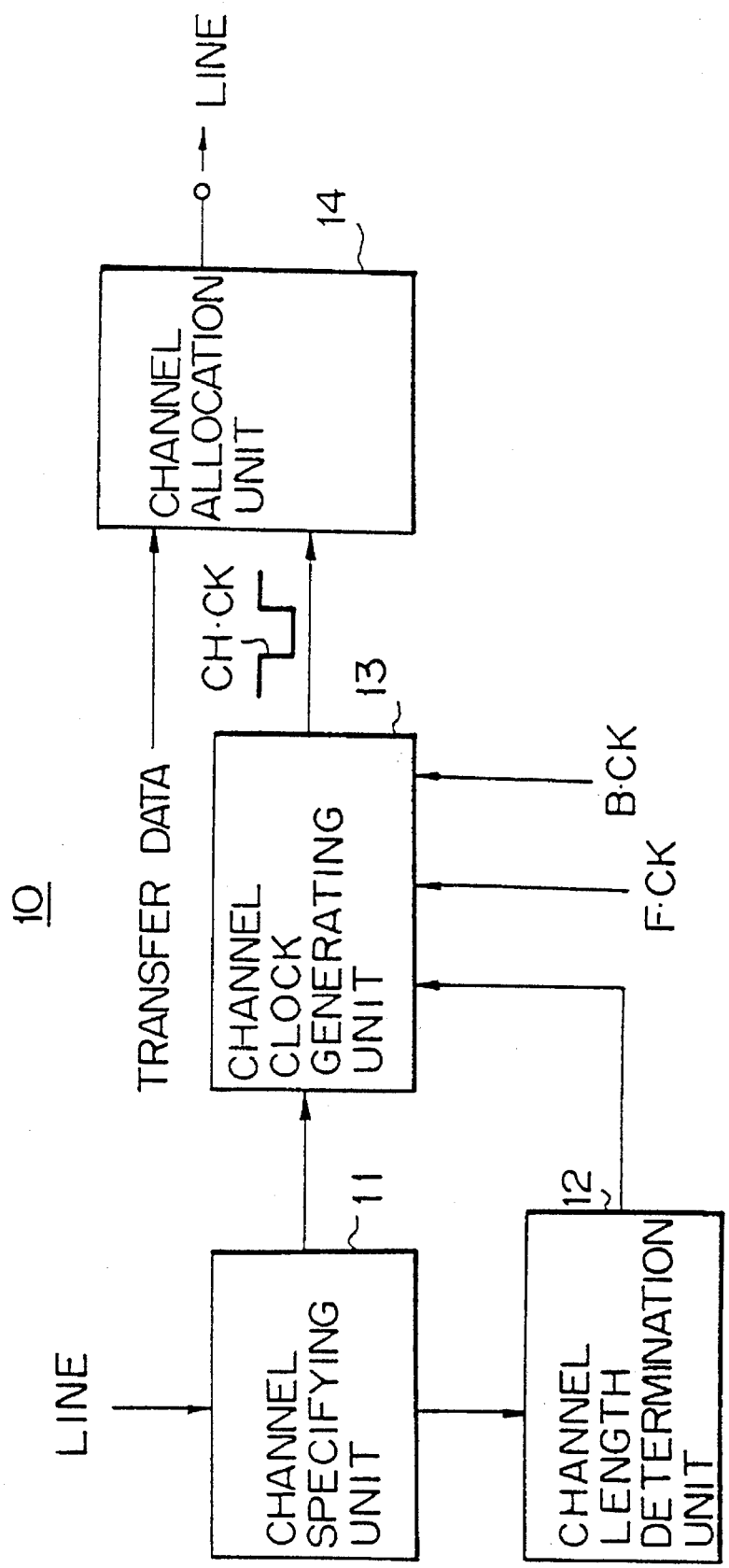
FIG. 3 is a block diagram of the basic constitution of an apparatus according to the present invention.

FIG. 3 is a block diagram of the basic constitution of an apparatus according to the present invention. In the figure, a transfer control apparatus 10 is comprised of a channel specifying unit 11, a channel length determination unit 12, a channel clock generating unit 13, and a channel allocation unit 14.

The channel specifying unit 11 specifies which channel CH the data input to the exchange should occupy and be transferred on. The length determination unit 12 determines the channel length which the specified channel should occupy. The channel clock generating unit 13 generates channel clocks CH.CK indicating the breakpoint between adjacent channels in synchronization with the channel length determined by the channel length determination unit 12 for each channel specified by the channel specifying unit. The channel allocation unit 14 receives the channel clocks CH.CK and successively allocates specified channels to the corresponding data at each changing point of the channel clocks.

As explained above, it is possible to allocate any line speed to any channel so it is possible to mix signals with different data transfer speeds in the frames.

As a first embodiment, two or more time slots are allocated to at least one channel.

Figure 4:
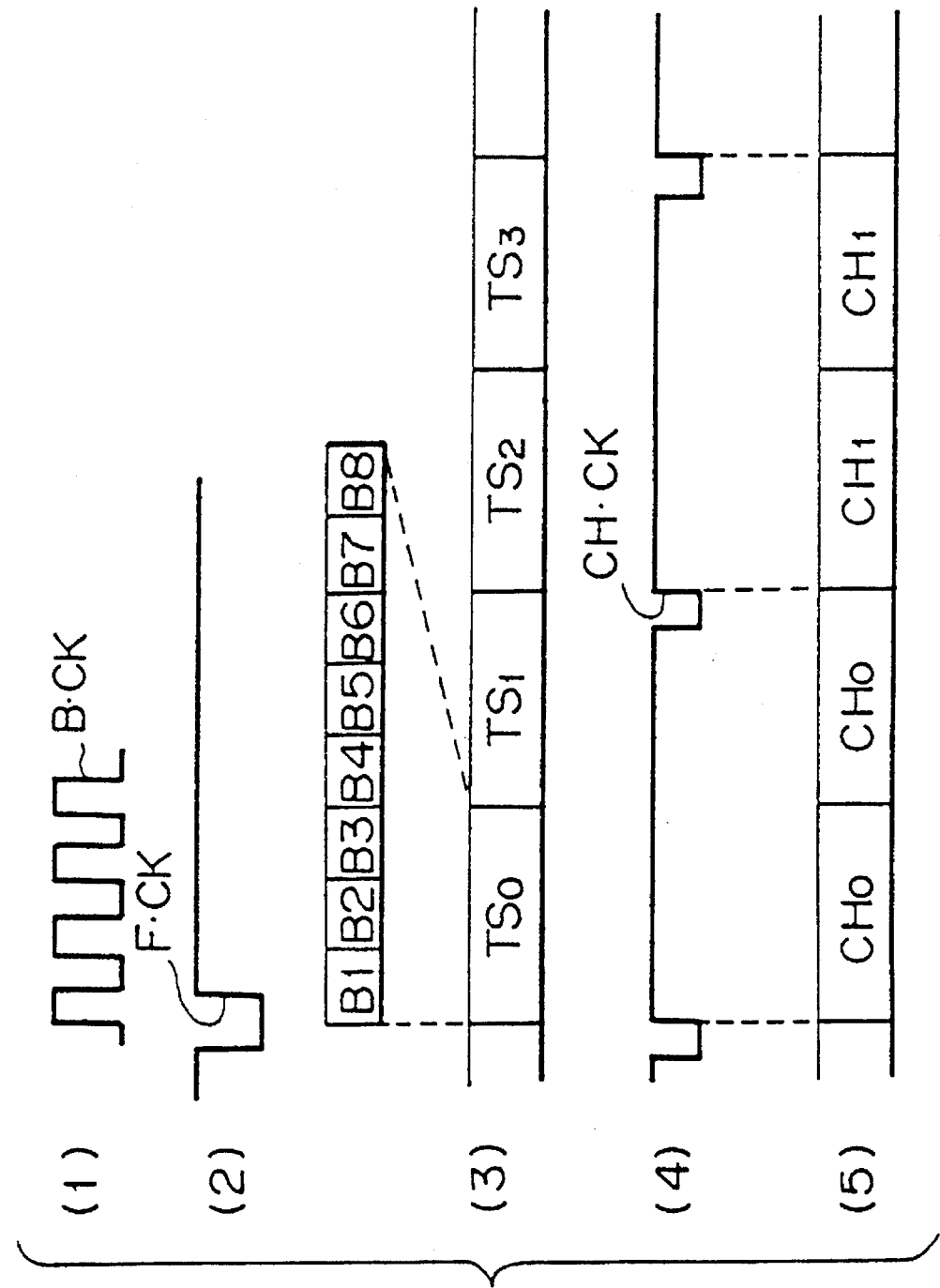
FIG. 4 is a view of a first embodiment of the transfer control mode according to the present invention.

FIG. 4 is a view of the first embodiment of the transfer control mode according to the present invention. The state of this was also shown in row (5) of FIG. 2. According to FIG. 4, two consecutive time slots $TS_2$ and $TS_3$ are allocated to the first channel $CH_1$.

As a second embodiment, when the time slots are comprised of a train of a predetermined fixed number of bits, one bit or a number of consecutive bits less than the train of a fixed number of bits is allocated to at least one channel.

Figure 5:
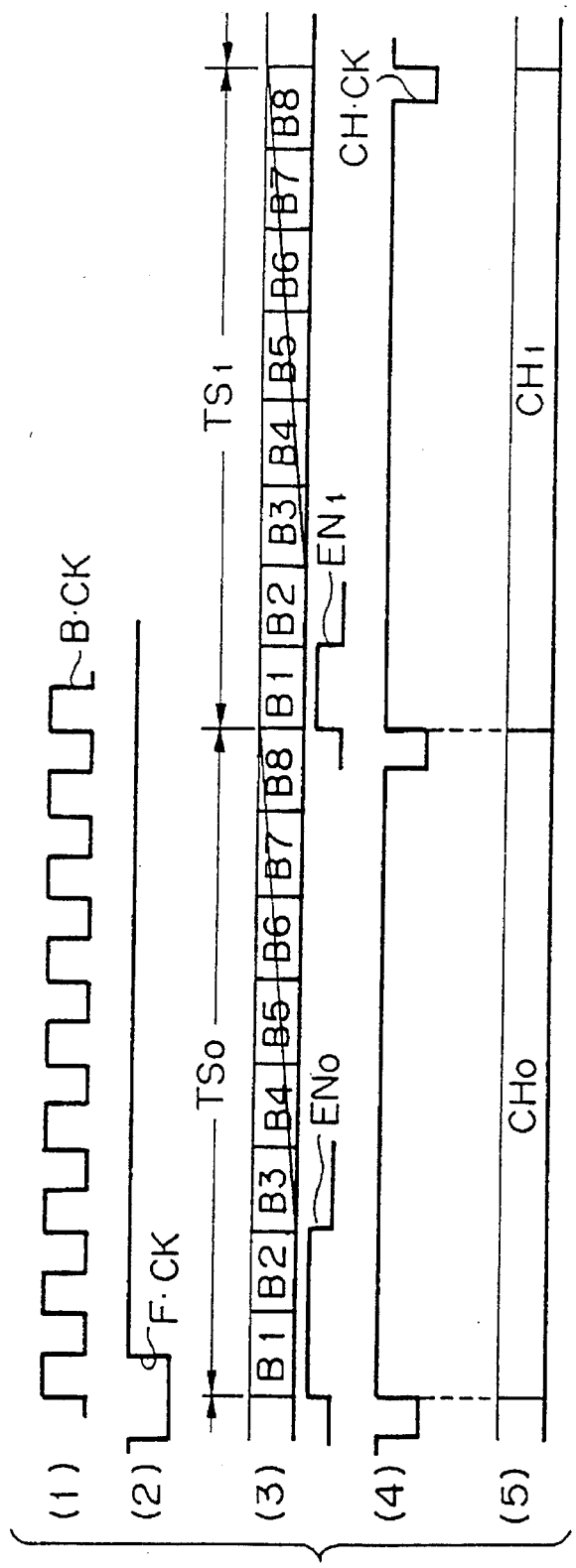
FIG. 5 is a view of a second embodiment of the transfer control mode according to the present invention.

FIG. 5 is a view of the second embodiment of the transfer control mode according to the present invention. As shown by row (3) and row (5) of this figure, two consecutive bits B1 and B2 are allocated to a channel $CH_0$ and one bit B1 is allocated to another channel $CH_1$ in the example shown.

In the channel $CH_1$, an enable signal $EN_0$ is given from the outside so as to specify the two consecutive bits B1 and B2. Further, similarly, in the channel $CH_2$, an enable signal $EN_1$ is given from the outside to specify the bit B1.

In the transfer control mode of FIG. 5, B3 to B8 are not used for the channel $CH_0$, while B2 to B8 are not used for the channel $CH_1$, so the efficiency of utilization of the line is poor.

If, however, for example, regarding the channel $CH_0$, the bit rate of the two units of terminal equipment communicating using this channel is 16 kbps, then it is sufficient to just use B1 and B2 (however, the bit rate when using all of B1 to B2 would be 64 kbps).

As a third embodiment, one bit or a number of consecutive bits is allotted to at least two channels and at least one time slot is occupied by a plurality of channels by time division.

Figure 6:
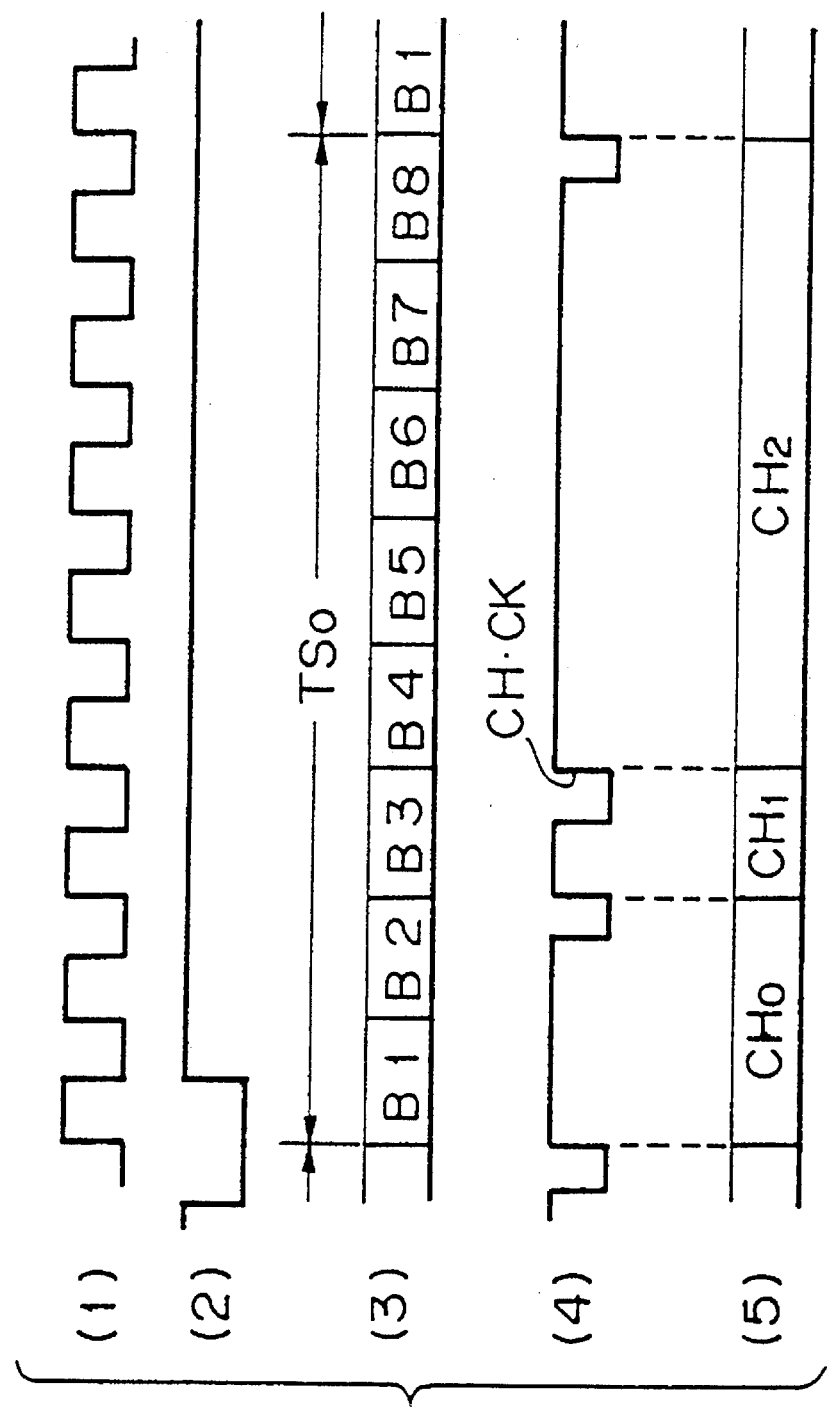
FIG. 6 is a view of a third embodiment of the transfer control mode according to the present invention.

FIG. 6 is a view of the third embodiment of the transfer control mode according to the present invention. The 0-th channel $CH_0$ occupies two consecutive bits B1 and B2, the first channel $CH_1$ occupies one bit B3, and the second channel $CH_2$ occupies five consecutive bits B4 to B8 in the example shown.

As a fourth embodiment, when the time slots are comprised of a train of a predetermined fixed number of bits, one time slot and the first bit or a number of consecutive bits less than the train of a fixed number of bits following the first bit in the following time slot are consecutively allocated to at least one channel.

Figure 7:
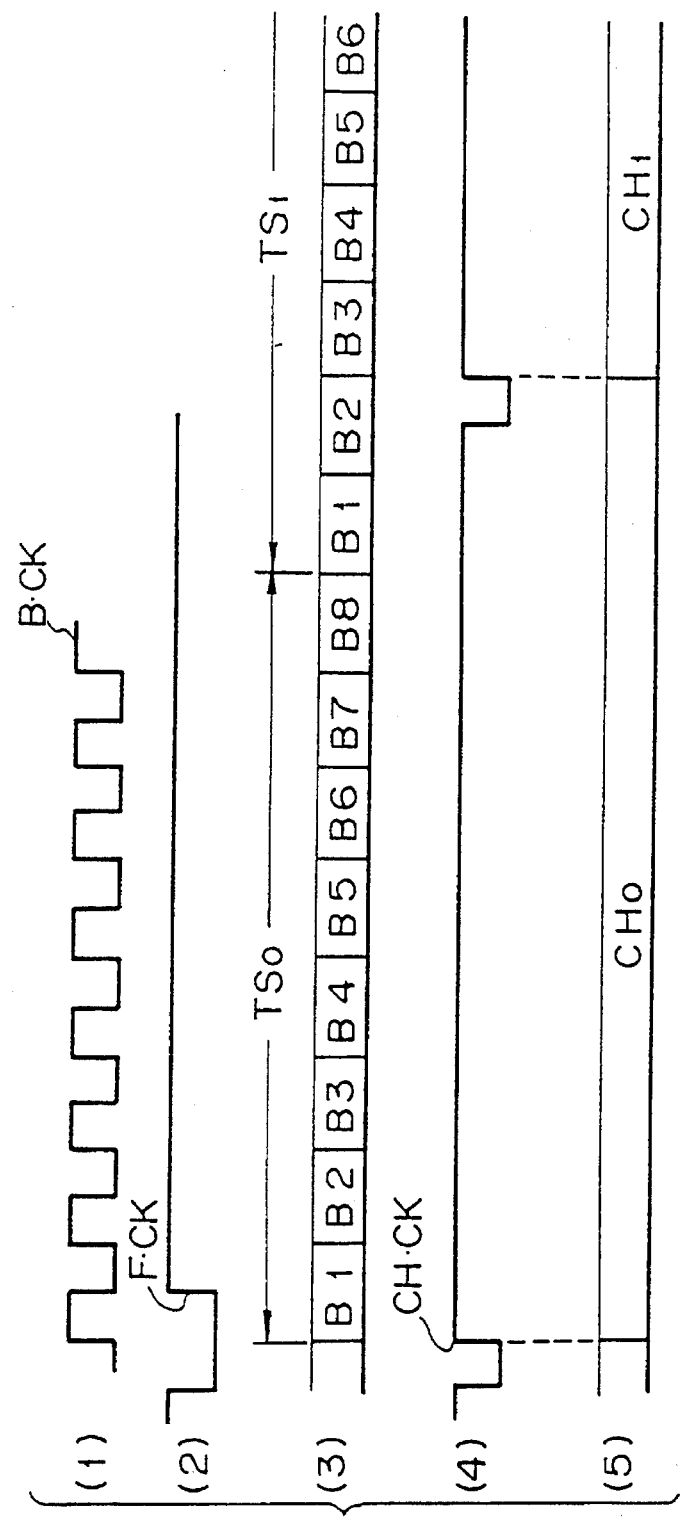
FIG. 7 is a view of a fourth embodiment of the transfer control mode according to the present invention.

FIG. 7 is a view of the fourth embodiment of the transfer control mode according to the present invention. In the figure, the 0-th channel $CH_0$ is allocated the time slot $TS_0$ and the two consecutive bits (B1, B2) in the following time slot $TS_1$ in the example shown. That is, 10 consecutive bits are allocated. Note that sometimes only the first bit B1 in the bits in $TS_1$ following $TS_0$ is allocated (allocation of nine consecutive bits).

As a fifth embodiment, when the time slots are comprised of a train of a predetermined fixed number of bits, at least two time slots and the first bit or a number of consecutive bits less than the train of a fixed number of bits following the first bit in the following time slot are consecutively allocated to at least one channel.

Figure 8:
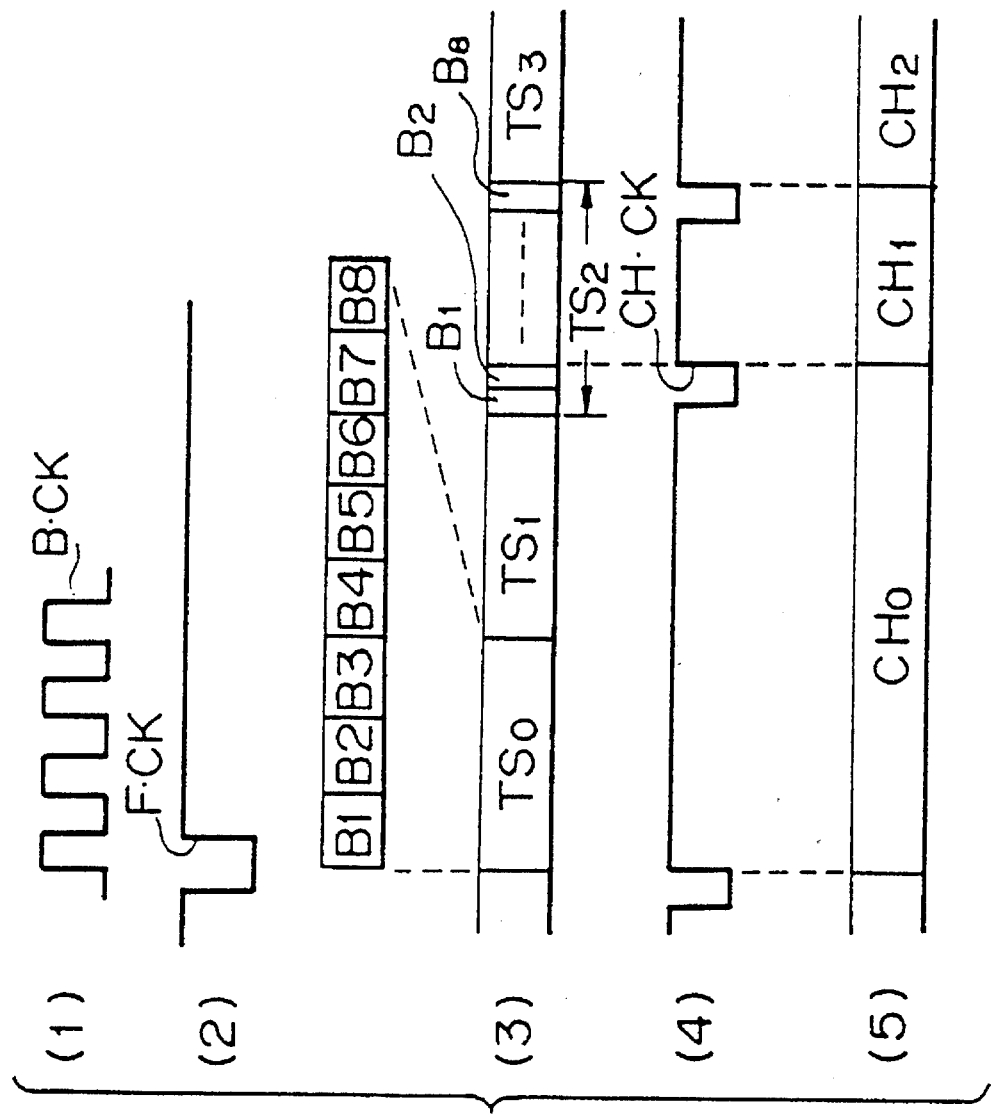
FIG. 8 is a view of a fifth embodiment of the transfer control mode according to the present invention.

FIG. 8 is a view of the fifth embodiment of the transfer control mode according to the present invention. In the figure, the 0-th channel $CH_0$ is allocated the two consecutive time slots $TS_0$ and $TS_1$ and the two consecutive bits B1 and B2 in the following time-slot $TS_2$ in the example shown. Note that sometimes only the first bit B1 in the bits in $TS_2$ is allocated.

In the above embodiments, as the way for obtaining variable channel lengths, channel clocks CH.CK indicating breakpoints between adjacent channels are generated and a plurality of channels are successively allocated at each changing point of the channel clocks CH.CK.

The changing points of the channel clocks CH.CK are determined in accordance with allocation information specified from the outside. This allocation information is specified by the units of the subscriber terminal equipment fixedly in advance or adaptively at the time of data transfer. When the models of the units of the subscriber terminal equipment are not changed, the channels used and the allocated channel lengths are determined fixedly in advance in accordance with a contract with the exchange.

When there are a number of models of subscriber terminal equipment, the allocated channel length is specified adaptively to the exchange in accordance with the required speed of data transfer of each model. The allocation information in this case is sent at necessary times to the exchange using a control information communicating means.

Figure 9:
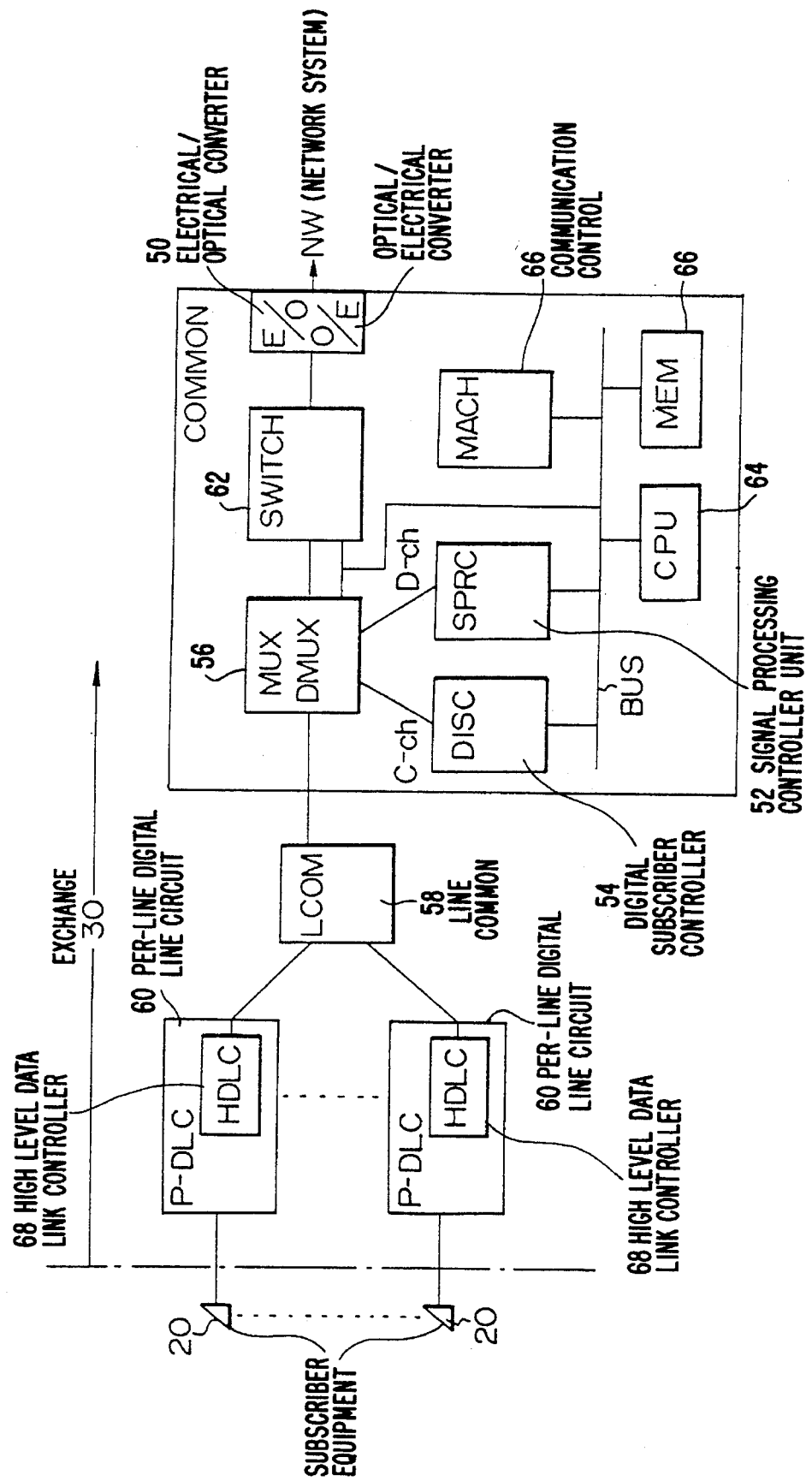
FIG. 9 is a view of an example of an exchange system to which the present invention is applied.

FIG. 9 is a view of an example of an exchange system to which the present invention is applied. In the figure, reference numeral 30 is an exchange to which the present invention is mainly applied. Data is transferred to and from units of subscriber terminal equipment 20. On the other hand, the exchange 30 is connected to a network system NW through an electrical/optical (E/O) converter and an optical/electrical (O/E) converter 50.

The area having direct relevance to the working of the present invention in the exchange 30 is the block SPRC, that is, the signaling processing controller unit 52. This is mainly formed, in this figure, by the component elements of FIG. 3. The SPRC unit 52 etc. is shared by a large number of subscriber terminal equipment and performs D-channel control.

The monitoring and other C-channel control is performed by the block DISC 54 (digital subscriber controller), which is connected together with the above-mentioned SPRC unit 52 to a multiplex/demultiplex unit 56 (MUX/DMUX).

This multiplex/demultiplex unit 56 is connected to a block LCOM 58 (line common). The LCOM unit 58 is a so-called line concentrating unit which performs multiplexing and demultiplexing of subscriber cards.

The LCOM unit 58 is connected to the units of subscriber terminal equipment 20 through the blocks P-DLC 60 (per-line digital line circuit) corresponding to those units.

In addition, the block SWITCH 62 is a digital exchanging unit, the block CPU 64 is a central processing unit in charge of overall control of the exchange, and the block MACH 66 is a unit for control of communication with the network NW side. MEM 66 is a memory.

The above-mentioned SPRC unit 52 performs D-channel control as mentioned above and cooperates with high level data link controller (HDLC) units 68 in the individual blocks P-DLC 60. That is, the HDLC functions of the units of the subscriber terminal equipment are shared with the P-DLC side. The SPRC unit 52 performs control for interfacing with the P-DLC's 60 and direct memory access (DMA) processing.

Figure 10:
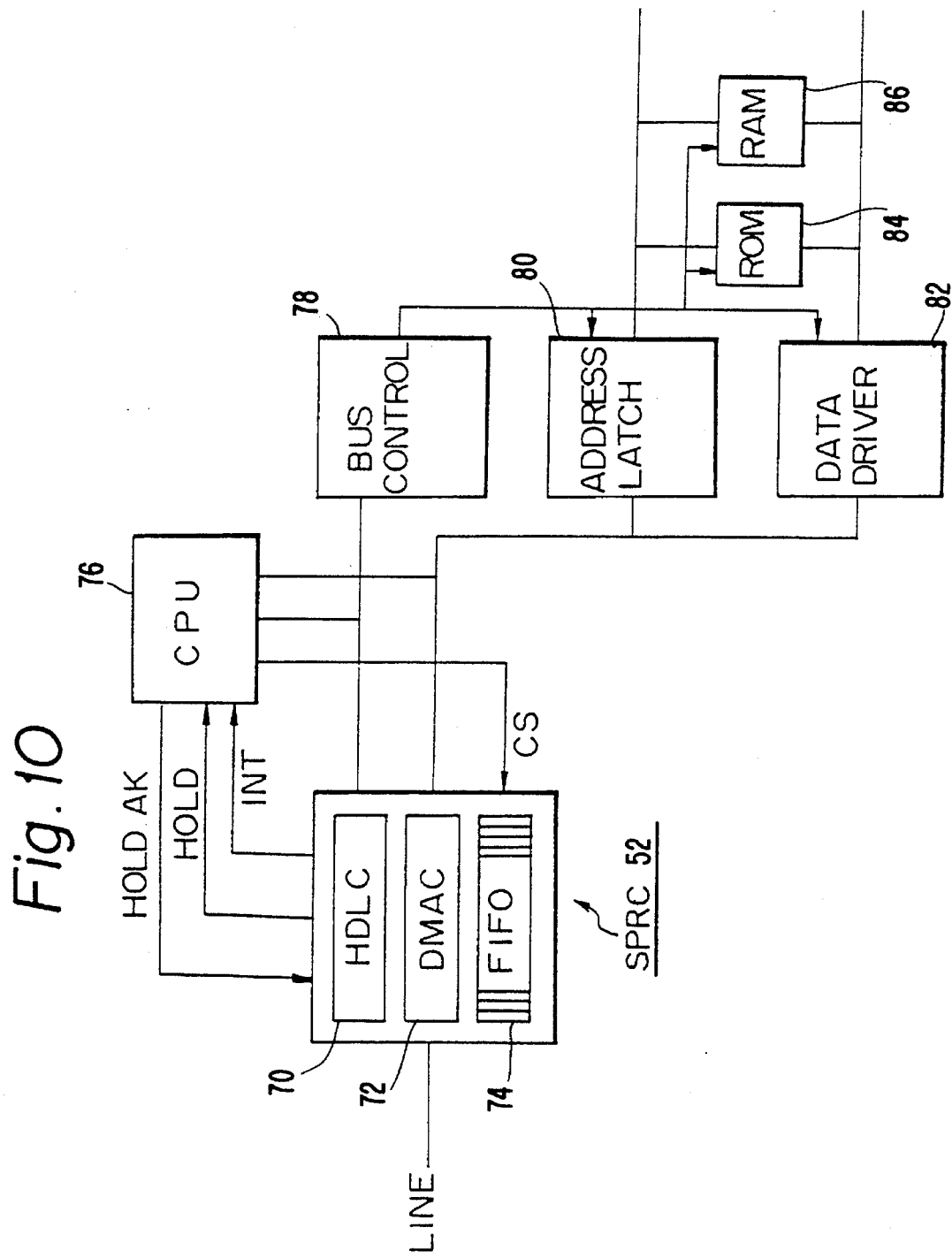
FIG. 10 is a view of the system construction relating to a block SPRC in FIG. 9.

FIG. 10 is a view of the system constitution relating to the block SPRC 52 in FIG. 9. The construction in this figure is known art and merely shows one example of the construction of an SPRC unit.

At the portion of the SPRC unit 52 connected to the line side, an HDLC unit 70 and DMAC (DMA controller) unit 72 are formed. If there is data received from subscriber terminal equipment, the HDLC unit 70 sends a hold request to the CPU 76 and transfers the data to the memory (RAM) 86. In the case of such a hold request, the transfer of data is started after waiting for a hold AK (acknowledge) to be returned. At this time, the received data is successively fetched to the FIFO (first-in-first-out) unit 74. Note that when the CPU 76 is to write in or read from a memory other than the FIFO unit (not shown), a chip select signal CS is applied. Further, Int in the figure means an interruption and is output when a line fault etc. occurs.

Figure 11:
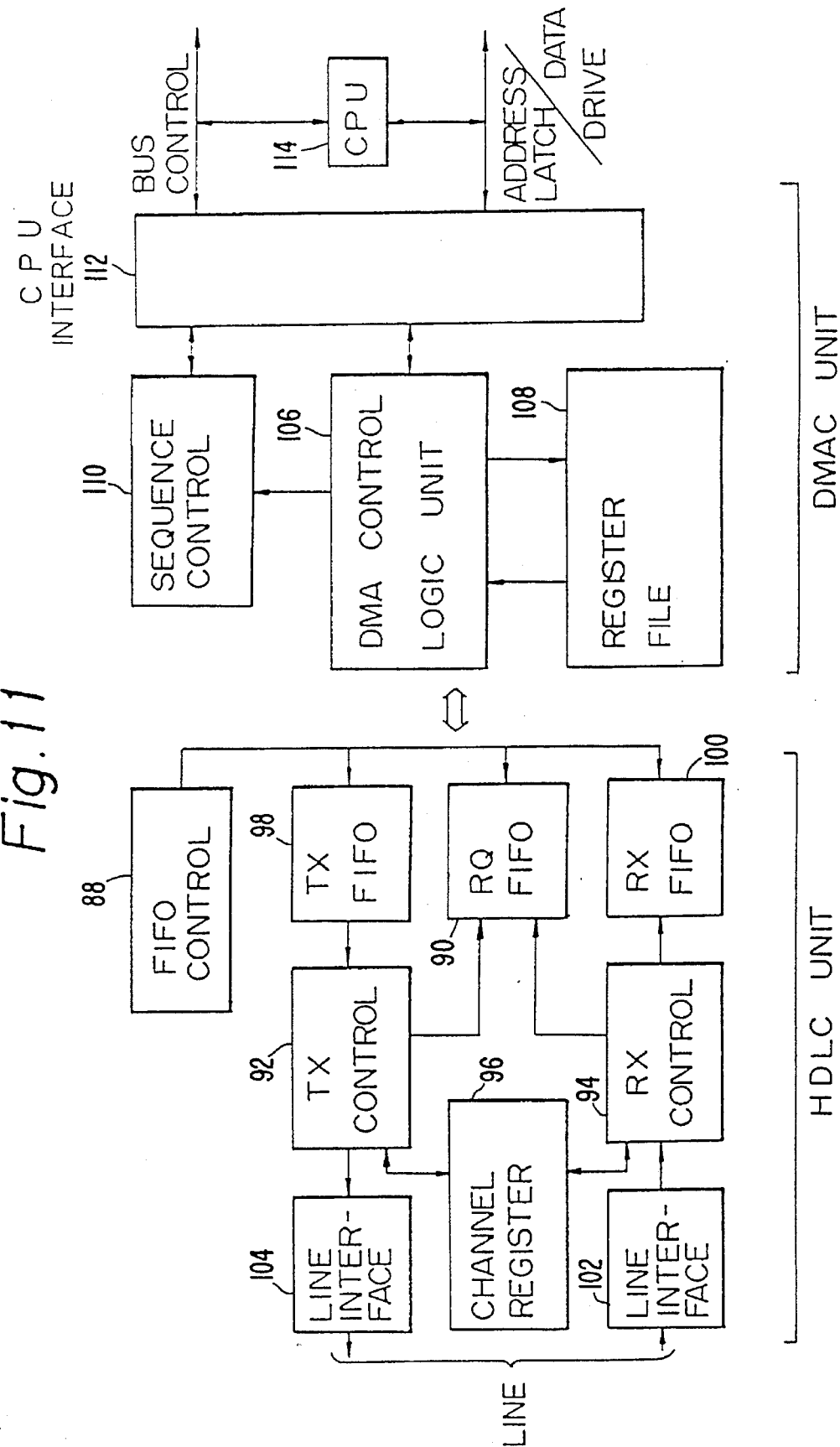
FIG. 11 is a view of an example of a line connecting part in FIG. 10.

FIG. 11 is a view of an example of a line connecting part in FIG. 10. The line connecting part shown in FIG. 10, when comprised as an LSI, may be roughly divided into an HDLC unit and a DMAC unit.

In FIG. 11, TX shows the transmission part, that is, the part for transmitting data to the subscriber terminal equipment, RX is a receiving part, that is, the part for receiving data from the subscriber terminal equipment. FIFO CONTROL 88 is an FIFO read counter and write counter. RQ.FIFO 90 holds the request from the TX CONTROL 92 and RX CONTROL 94. TX CONTROL 92 performs "0" insertion, flag detection, etc., while RX CONTROL 94 performs "0" deletion, flag detection, etc. so as to form the HDLC format. A channel register 96 is connected to TX CONTROL 92 and RX CONTROL 94 and functions as an information register for each channel (CH). The information includes, for example, the number of bits of the data currently input, the number of consecutive "1"s in the bit train, etc.

In the DMAC unit cooperating with the HDLC unit, the DMA control logic unit specifies the address increments and number of transferred bytes in the DMA transfer to the memory RAM 86 of FIG. 10. This information is stored in the register file 108. The sequence control unit 110 manages the sequence of the DMAC unit and HDLC unit as a whole.

The construction of FIG. 11 is that of an existing LSI layout. To transfer data in accordance with the present invention, however, an exterior LSI is added in addition to this LSI.

Figure 12:
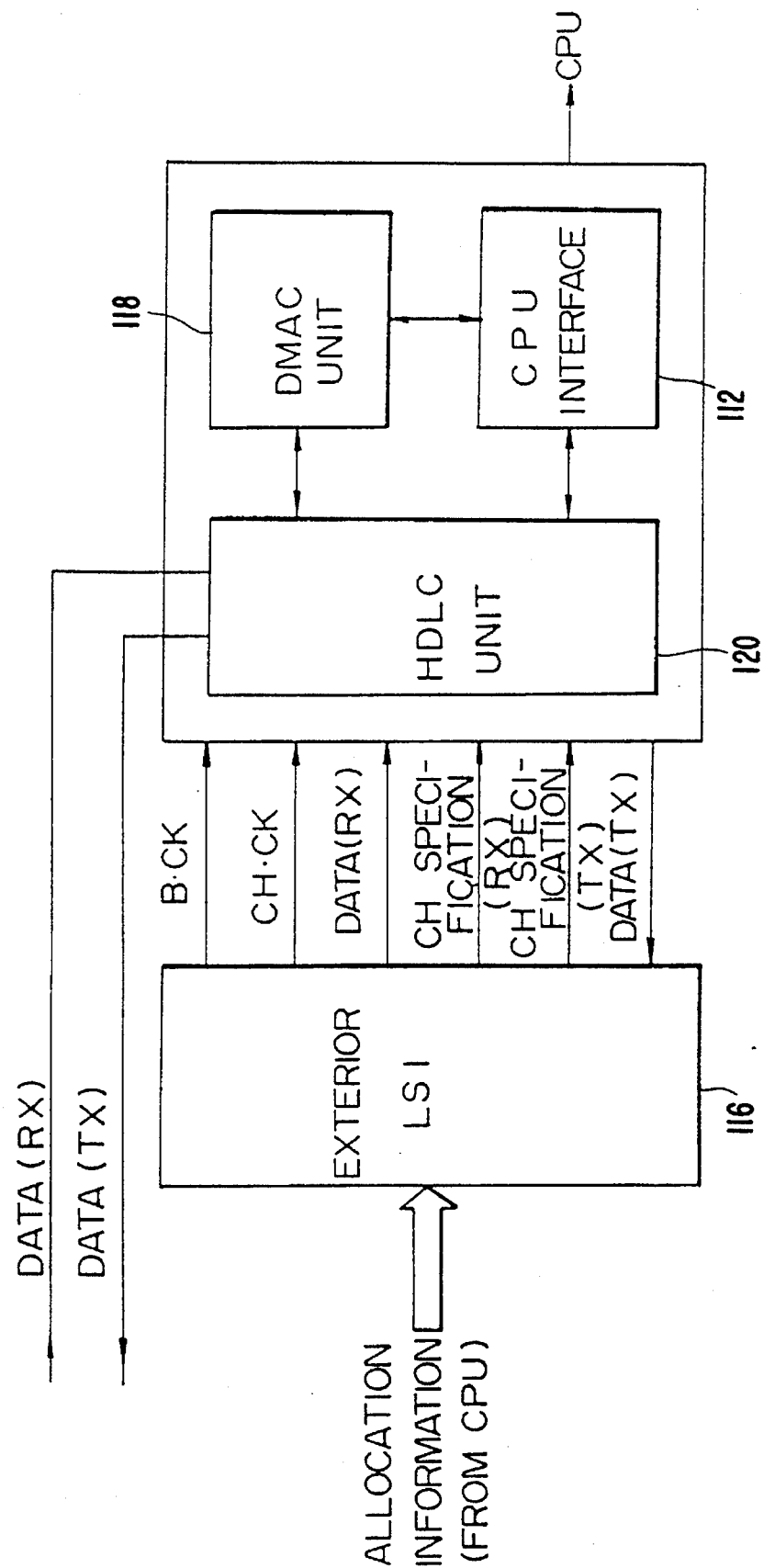
FIG. 12 is a view of the outside of a transfer control apparatus according to the present invention.

FIG. 12 is a view of the outside of a transfer control apparatus according to the present invention. The LSI on the right is an existing LSI, details of which were explained with reference to FIG. 11. To work the invention, in addition to this LSI 116, an exterior LSI at the left side of the figure is needed.

The transfer control apparatus shown in FIG. 3 is shown by functional blocks, but in actuality it is realized by the two LSI's shown in FIG. 12. The body of the exterior LSI 116 can be comprised by a counter and a RAM. The counter counts the basic clocks B.CK and shows which bit of which time slot of the frame the data currently is. That is, it produces a time scale. The RAM receives the time scale and outputs a channel clock CH.CK and a CH specification signal specifying which channel (CH) is to be occupied. If the channel allocation is fixed in advance, the RAM may be changed to a ROM.

Figure 13:
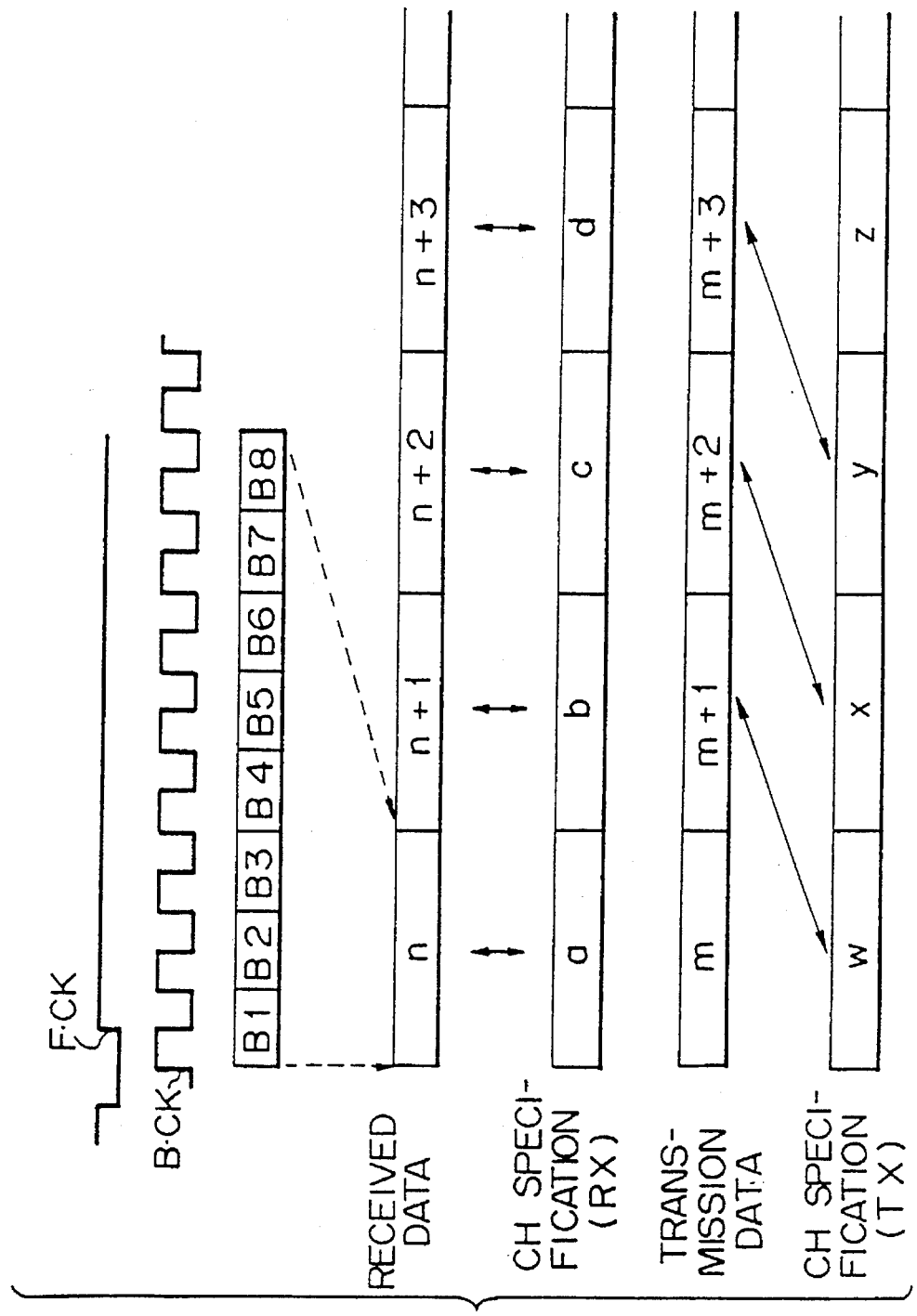
FIG. 13 is a time chart for explaining the operation of the apparatus of FIG. 12.

FIG. 13 is a time chart for explaining the operation of the apparatus of FIG. 12. The channel specification for the received data n is a, that for n+1 is b, for n+2 c, for n+3 d, etc. a is $CH_0$, b is $CH_1$, c is $CH_2$, etc. or a is $CH_0$, b is $CH_0$, c is $CH_0$, and d is $CH_1$.

On the other hand, for the transmission data side as well, similarly, the channel specification for the transmission data m, m+1, m+2, m+3 . . . is w, x, y, z . . . w, x, y, z . . . are flexibly given channel allocations in the same way as with the received data. In the case of transmission data, however, there is a time deviation as illustrated. At times of reception, the allocation information corresponding to the received data is immediately known. The reason is that the subscriber terminal equipment corresponding to the received data is known at the time of call set-up. In the case of transmission data, however, exchange processing is performed by the digital exchange unit SWITCH 62 of FIG. 9 and the channel allocation is not determined until it is determined with which subscriber terminal equipment to set up the call. The time lag during this period appears as the above-mentioned time deviation.

Figure 14:
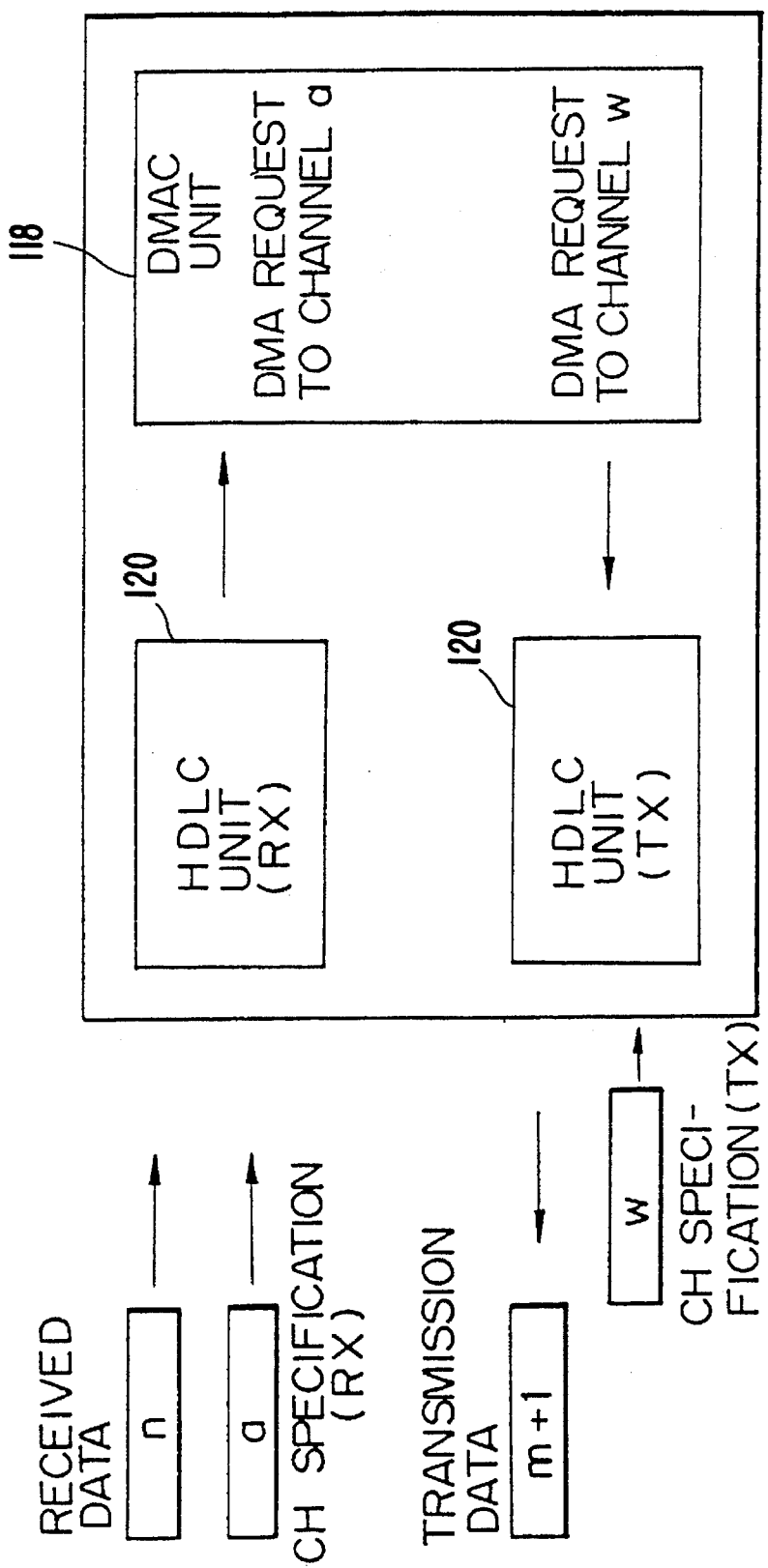
FIG. 14 is a view showing part of the operation of FIG. 13 expressed in terms like an apparatus.

FIG. 14 is a view showing part of the operation of FIG. 13 expressed in terms of an apparatus. The HDLC unit 120 and the DMAC unit 118 were previously explained.

Figure 15:
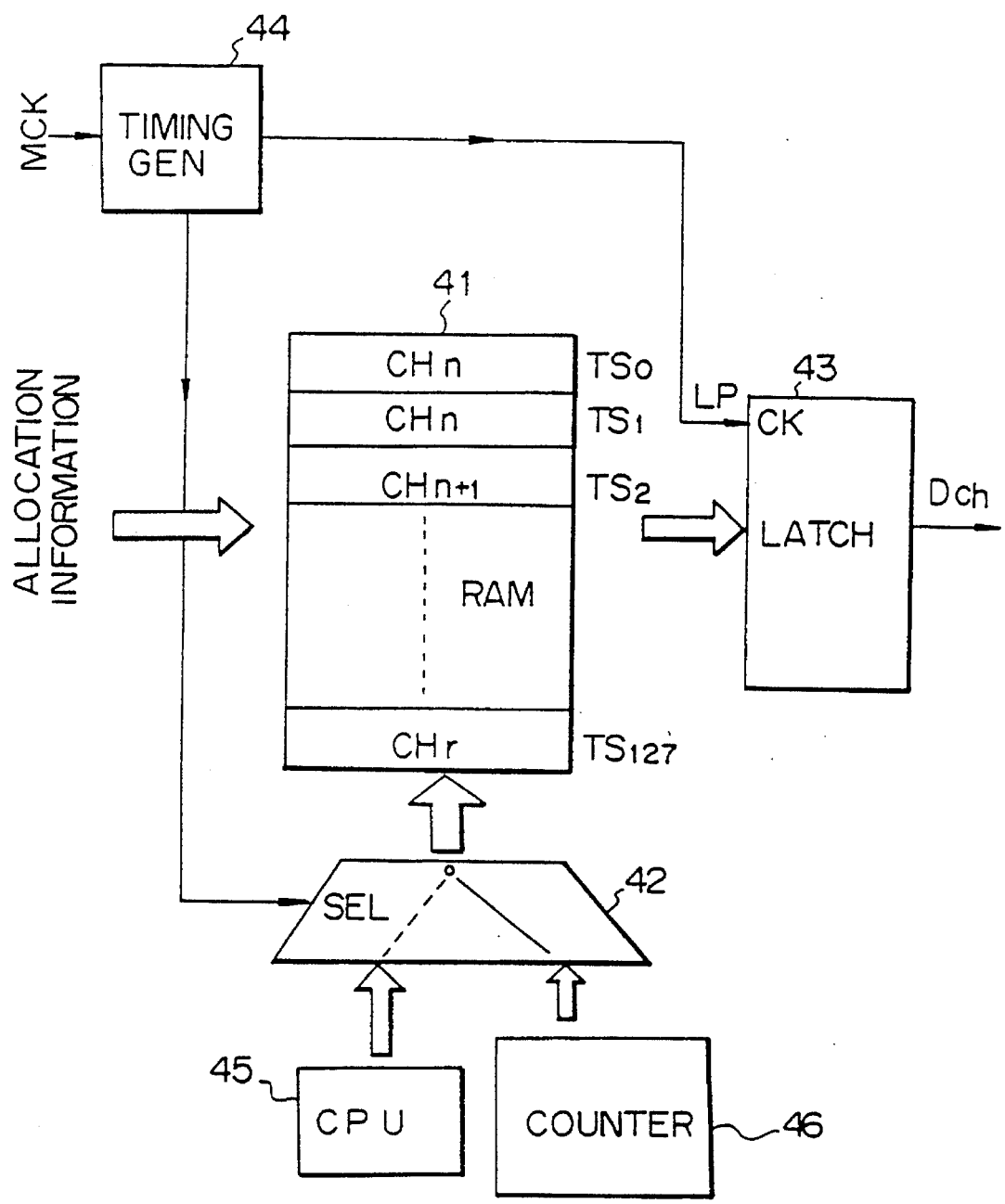
FIG. 15 is a schematic block diagram of a specific example of an exterior LSI shown in FIG. 12.
Figure 16:
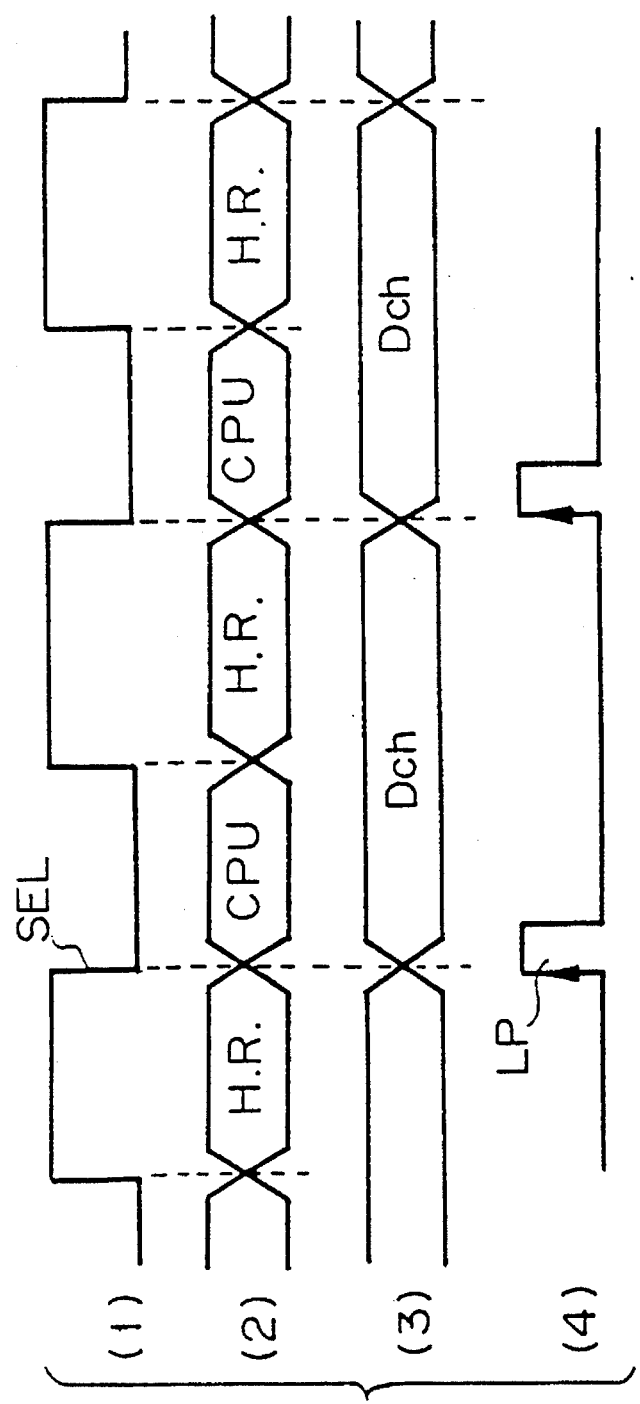
FIG. 16 is a time chart of the basic operation in FIG. 15.

FIG. 15 is a schematic block diagram of a specific example of an exterior LSI shown in FIG. 12, and FIG. 16 is a time chart of the basic operation in FIG. 15. In FIG. 15, 41 is a RAM, 42 is an address selector, 43 is a latch circuit, 44 is a timing generator, 45 is a CPU, and 46 is a sequential counter.

In the RAM 41 is a memory area divided corresponding to the time slots $TS_0$ to $TS_{127}$. In there, the channel numbers ($CH_n$, $CH_{n+1}$ . . . $CH_r$) which must be processed in the time slots are written.

The data $D_{ch}$ showing the channel numbers read out in synchronization with the time slots is held once in the latch circuit 43 and then is supplied to the above-mentioned HDLC unit 120.

The channel numbers are written in the RAM 41 by the allocation information and a write address signal from the CPU 45. That is, for example, an operation is performed to write $CH_{n+1}$ in $TS_2$. On the other hand, the channel numbers are read out from the RAM 41 by read address signals supplied from a sequential counter 46.

The operation for writing by the CPU 45 and the operation for reading by the counter 46 are performed alternately. For this purpose, a timing generator 44 which receives as input a master clock MCK inputs a selection signal SEL (see row (1) of FIG. 16) to an address selector 42. When the signal SEL is "H" (high), a hardware read (HR) operation, that is, reading of the channel numbers from the RAM 41, is performed. The read data $D_{ch}$ is held by the latch circuit 43 until shifting to the next time slot. The latch timing is specified by e latch pulse LP from the timing generator 44. When the selection signal is "L" (low), a write address signal from the CPU 45 is selected and allocation information is written into the RAM 41.

Finally, examples of actual numbers will be given. In the first embodiment (FIG. 4), if one frame is 1 ms, the channel $CH_0$ occupies the time slots $TS_0$ and $TS_1$, so 16 bits are processed in 1 ms. This is equivalent to a 16 kbps data transfer. In this case, assuming that the other channels occupy four time slots, 32 kbps data transfer becomes possible. Therefore, it becomes possible to handle mixed data of different speeds. Seen from another angle, there are no longer any restrictions on the line speed. Further, it is possible to change the speed of data transfer midway. That is, an exchange network with a high degree of freedom of transfer for the subscriber terminal equipment is realized.

In the second embodiment (FIG. 5), if B1 to B8 are 64 kbps data, the channel $CH_0$ transfers 16 kbps data and the channel $CH_1$ transfers 8 kbps data.

As explained above, according to the present invention, it is possible for any channel to transfer data at any speed and therefore an exchange network with a high degree of freedom of data transfer is realized.

We claim:

1. An exchange performing a data transfer between a plurality of subscriber terminal equipment by sharing a plurality of channels in time division multiplex, comprising:

a channel length specifying means for receiving respective channels and specifying a variable total bit length of each channel;

a clock supplying means for supplying a channel clock in synchronism with the variable total bit length specified by the channel length specifying means, said channel clock indicating a breakpoint between adjacent channels; and an allocation means for allocating respective channels a consecutive serial bit train included in a data frame of a time division multiplex mode in synchronization with said channel clock supplied from said clock supplying means.

2. An exchange as recited in claim 1, wherein said consecutive serial bit train included in said frame is comprised of a plurality of time slots, each time slot having a same total bit length.

3. A system as set forth in claim 2, wherein at least two consecutive time slots are allocated to at least one channel.

4. A system as set forth in claim 2, wherein each time slot is comprised of a train of a predetermined number of bits, and wherein one bit or a number of consecutive bits less than the train of a predetermined fixed number of bits is allocated to at least one channel.

5. A system as set forth in claim 4, wherein said one bit or said number of consecutive bits is allocated to each of at least two channels such that one time slot is used by at least two channels by time division.

6. A system as set forth in claim 2, wherein each time slot is comprised of a train of a predetermined number of bits, and wherein one time slot and the first bit or a number of consecutive bits less than the train of a predetermined number of bits following said first bit in the following time slot are consecutively allocated to at least one channel.

7. A system as set forth in claim 2, wherein each time slot is comprised of a train of a predetermined number of bits, and wherein at least two time slots and the first bit or a number of consecutive bits less than the train of a predetermined number of bits following said first bit in the following time slot are consecutively allocated to at least one channel.

8. A system as set forth in claim 2, wherein said allocation information is specified by said subscriber terminal equipment fixedly in advance or adaptively when transferring data.

9. An exchange performing a dam transfer between a plurality of subscriber terminal equipment by sharing a plurality of channels in time division multiplex, comprising:

a channel specifying means for specifying a channel which data input to the exchange should occupy to transmit said data;

a channel length determining means for determining a total bit length of a consecutive serial bit train of a data frame to be occupied by said channel specified by said channel specifying means;

a channel clock generating means for generating a channel clock indicating a breakpoint between adjacent channels in synchronization with the channel length determined by said channel length determining means for said channel specified by said channel specifying means; and a channel allocating means for receiving said channel clock and successively allocating to said data said specified channel at a changing point of the channel clock.

\* \* \* \* \*

UNITED STATES PATENT AND TRADEMARK OFFICE
CERTIFICATE OF CORRECTION

PATENT NO. : 5,553,066
DATED : September 3, 1996
INVENTOR(S) : Yoshiharu KATO et al.

It is certified that error appears in the above-indentified patent and that said Letters Patent is hereby corrected as shown below:

On the title page:

In Section [56], line 1, change "Ciercierski" to --Ciecierski--.

Column 2, line 36, change "B.CK" to --B·CK--;
line 39, change "F.CK" to --F·CK--;
line 55, change "B.CK, F.CK" to --B·CK, F·CK--.

Column 3, line 7, after "The", insert --channel--;
line 10, change "CH.CK" to --CH·CK--;
line 15, change "CH.CK" to --CH·CK--;
line 36, change "CH$_o$and" to --CH$_o$ and--.

Column 4, line 22, change "CH.CK" to --CH·CK--;
line 25, change "CH.CK" to --CH·CK--;
line 26, change "CH.CK" to --CH·CK--.

UNITED STATES PATENT AND TRADEMARK OFFICE
CERTIFICATE OF CORRECTION

PATENT NO. : 5,553,066
DATED : September 3, 1996
INVENTOR(S) : Yoshiharu KATO et al.

It is certified that error appears in the above-indentified patent and that said Letters Patent is hereby corrected as shown below:

Column 5, line 17, after "unit" insert --52--;

line 64, after "LSI" (first occurrence), delete "116"; and after "LSI" (second occurrence), insert --116--.

Column 6, line 3, change "B.CK" to --B·CK--;
line 6, change "CH.CK" to --CH·CK--;
line 64, change "e" to --a--.

Column 8, claim 9, line 24, change "dam" to --data--.

Signed and Sealed this

Third Day of June, 1997

Attest:

BRUCE LEHMAN

Attesting Officer

Commissioner of Patents and Trademarks